US011211084B1

(12) United States Patent
Zeng et al.

(10) Patent No.: US 11,211,084 B1
(45) Date of Patent: Dec. 28, 2021

(54) PROTECTIVE SHIELDS UNDER TOUCHDOWN CONDITIONS FOR THERMALLY ASSISTED PERPENDICULAR MAGNETIC RECORDING

(71) Applicants: SAE Magnetics (H.K.) Ltd., Shatin (HK); Headway Technologies, Inc., Milpitas, CA (US)

(72) Inventors: Qinghua Zeng, Fremont, CA (US); Siu Yin Ngan, San Jose, CA (US); Ellis Cha, San Ramon, CA (US); Kowang Liu, Fremont, CA (US)

(73) Assignees: SAE Magnetics (H.K.) Ltd., Shatin (HK); Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 17/072,302

(22) Filed: Oct. 16, 2020

(51) Int. Cl.
| *G11B 11/105* | (2006.01) |
| *G11B 5/39* | (2006.01) |
| *G11B 5/60* | (2006.01) |
| *G11B 5/48* | (2006.01) |
| *G11B 5/00* | (2006.01) |

(52) U.S. Cl.
CPC .......... *G11B 5/3912* (2013.01); *G11B 5/4866* (2013.01); *G11B 5/607* (2013.01); *G11B 5/6076* (2013.01); *G11B 2005/0021* (2013.01)

(58) Field of Classification Search
None
See application file for complete search history.

(56) References Cited

U.S. PATENT DOCUMENTS

| 8,085,498 | B2 * | 12/2011 | Bai | G11B 5/3116 |
| | | | | 360/125.03 |
| 8,593,762 | B1 * | 11/2013 | Sasaki | G11B 5/315 |
| | | | | 360/125.29 |
| 8,619,389 | B1 * | 12/2013 | Saito | G11B 5/187 |
| | | | | 360/123.06 |
| 8,817,418 | B1 * | 8/2014 | Matsuo | G11B 5/315 |
| | | | | 360/125.02 |
| 8,817,425 | B1 | 8/2014 | Wu et al. | |
| 8,854,764 | B2 | 10/2014 | Chiu et al. | |
| 8,879,208 | B1 * | 11/2014 | Liu | G11B 5/11 |
| | | | | 360/125.3 |
| 10,354,680 | B2 | 7/2019 | Rajauria et al. | |
| 10,360,935 | B1 * | 7/2019 | Liu | G11B 5/3166 |
| 10,629,233 | B1 * | 4/2020 | Ngan | G11B 5/6011 |
| 10,679,653 | B1 * | 6/2020 | Zeng | G11B 5/607 |
| 10,811,034 | B1 * | 10/2020 | Wu | G11B 5/3143 |
| 10,872,628 | B1 * | 12/2020 | Shimazawa | G11B 5/6082 |
| 11,011,192 | B1 * | 5/2021 | Xu | G11B 5/6082 |

(Continued)

*Primary Examiner* — Tan X Dinh
(74) *Attorney, Agent, or Firm* — Saile Ackerman LLC; Stephen B. Ackerman

(57) ABSTRACT

A Perpendicular Magnetic Recording (PMR) head is configured for use in Thermally Assisted Magnetic Recording (TAMR). Two or three contiguous write shields, of various widths and thicknesses, formed on a leading edge side of the write gap (WG), main pole (MP) and near-field transducer (NFT), protect the head during write touchdowns (TD) and signal the approach of such a touchdown. Moreover during a write touchdown the contact with the head is restricted to the large write shields, producing a large touchdown area (TDA) and insuring the lifetime of the head.

20 Claims, 8 Drawing Sheets

(56) References Cited

U.S. PATENT DOCUMENTS

2009/0310262 A1* 12/2009 Wu .......................... G11B 5/11
                                                          360/319
2016/0019922 A1*  1/2016 Ota ...................... G11B 5/6011
                                                        369/13.27

* cited by examiner

PROTECTIVE SHIELDS UNDER TOUCHDOWN CONDITIONS FOR THERMALLY ASSISTED PERPENDICULAR MAGNETIC RECORDING

1. TECHNICAL FIELD

This disclosure relates to magnetic write heads that write on magnetic recording media, particularly to thermally assisted magnetic recording (TAMR) and to the design of shield configurations that will protect against damage under touchdown (TD) conditions.

2. BACKGROUND

Perpendicular magnetic recording (PMR) heads have made it possible to extend the recording density of hard disk drives (HDD) beyond 100 Gb/in2 (100 gigabytes per square inch) However, even using PMR heads, it is difficult to extend the density beyond 1 Tb/in2 due to thermal instabilities and the media's super-paramagnetic limit (the inability of the magnetic recording media to maintain a stable domain structure).

In order to achieve a higher recording density, a new technology has been developed: Thermally Assisted Magnetic Recording (TAMR). The reasoning behind TAMR is as follows. The media that are now used to record at these ultra-high densities must have extremely high coercivities so that data, once it is recorded, can remain stable even when subjected to thermal effects. Unfortunately, the high coercivities required to maintain the data once it is recorded, also makes it difficult for the small PMR heads to provide the necessary flux to actually record that data. One way to record on highly coercive recording media, is to heat the recording media during the actual recording process so that it reaches its Curie temperature, temporarily reducing its coercivity, and then to record the data on the heated surface. When the surface cools, the coercivity is restored to its ambient value and the recorded data is then thermally stable.

A typical TAMR recording apparatus is furnished with a slider-mounted PMR read/write head configured to transfer optical energy to the surface of a magnetic recording disk having high coercivity. For the TAMR operational portion, a laser diode is typically used to provide optical energy in the form of optical radiation, an optical waveguide then transfers that radiation towards the ABS of the head where it's main pole (MP) is close to the recording surface and where a plasmon near-field transducer (NFT) is also located. The NFT utilizes a plasmon generator, which is a device that receives the optical radiation from the waveguide, converts it to plasmon modes by electromagnetic coupling and then transfers energy in the form of plasmon near-fields to a small region of the recording media at the write-gap (WG) portion of the PMR read/write head. The localized, non-radiative, near-field energy appears as a near-field spot at the tip of the plasmon generator's ABS, which is located just below the trailing edge side of the magnetic pole tip of the MP. This tiny near field spot, which, being non-radiative, is not subject to diffraction effects, induces a very localized temperature rise in the recording media to lower its coercivity and assist the magnetic writing. At the same time, however, the near-field energy induces a very sharp or localized thermal protrusion on the recording head that causes many undesirable issues that should be dealt with. The present disclosure will address the read/write head, particularly in its thermal-mechanical aspect and will not provide any additional description of the TAMR components that produce the near-field spot as they are now well known in the field. We will also not deal with features of the TAMR head regarding where the near-field energy is deposited and the read/write operations occur.

In a TAMR head, there are typically two heating elements (heaters) embedded. The purpose of these heaters is to produce local thermal protrusions of the slider air-bearing surface (ABS) which serve to control the distance (flying height) between the ABS and the recording disk surface and thus enable reading and writing to occur at high surface area densities. One of the heaters, the reader heater, Hr, is positioned close to the read element and the other heater, the write heater, Hw, is close to the write element. Typically, the Hr is energized during reading, to bring the read element close to the disk, while Hw, the write coil and the tiny near field spot are energized during writing, to bring the write head close to the disk, produce the magnetic write field and heat the region of the disk on which writing is to occur.

The read element is located between two read shields. During read heater touchdowns (Hr TD), that are caused by intentionally activating the reader heater, Hr, so that the read element is brought close to the disk, there may be actual contact or impending contact between the disk and the read element at the head ABS (also called head-disk-interference or HDI). During such events, these read shields play two roles, they form a guard-band (in a cross-track direction) to protect the read element from wear due to an actual contact and they have enough area to produce a vibration that indicates that a TD is occurring. These vibrations can be picked-up by HDI sensors (HDIs).

Referring to FIG. 1A, we see an ABS view schematic illustration of a typical prior art read/write head (design "A") showing the basic positioning of all elements. A lower (trailing side) read shield 10 and an upper (leading side) read shield 30 protect a read element 20. A read heater, Hr, (not visible in this view) would be positioned on top of the lower read shield 10, away from (behind) the ABS. A series of write shields are disposed about the write element. In this design there is shown a lower write shield 50, a first write shield 60, a second write shield 70 and a narrow upper write shield 100. These shields guard a write element, of which only the magnetic pole tip, MP 91, surrounded on both sides by side shields 90, is shown. A write heater, Hw, (not visible because it is away from the ABS, but shown in FIG. 5) is positioned on an upper surface of one of the lower write shields adjacent to the write head. A head-disk-interference sensor (HDIs) 40 may be used to signal a touchdown, in conjunction with the vibration of the shields. Note that the near-field transducer (NFT) and the near-field spot it produces (not shown), produced by a laser-coupled plasmon generator in a TAMR system would appear below the main pole (MP) of the write element 91. FIG. 5 will show some of the TAMR elements.

Prior art Design A shown in FIG. 1A has the following two problematic issues: (1) in the pre-heat process, where only Hw is energized; and: (2) in write TDs, where both Hw and the write coil are energized, TD area (TDA) is very small and TD detection is very difficult to achieve.

Referring next to FIG. 1B, there is shown a less detailed version of the ABS view of FIG. 1A, showing a small curved and shaded region 150 covering the elements 90, 91 and 100. This region is the area of the TD (TDA) in a write TD as determined by simulations.

Referring to FIG. 1C, there is shown a graphical representation (solid line) of the simulated slider ABS fly height (z) of down-track positions (x) along the slider ABS as a simulated write TD occurs (at approx. x=14 μm). Several regions of particular interest along the slider ABS are shown as vertical "bumps" with various identifying dashed lines passing through them. These three bumpy regions are the write gap (WG) at about 12.5 μm, the head-disk interference sensor (HDIs) at about 8.5 μm and the read gap (RG) at 7 μm.

FIG. 1B shows the simulated cross-track (y dimension) profile of the TD contact region of the head (small curved area 150), at about x=14 μm in FIG. 1C. This area is basically the upper shield of the write-head (shown as 100 in FIG. 1A) and the side shields 90. Slightly behind (trailing side) this region, is the writer gap, WG, (region of pole tip 91 emergence) at about x=12.5 μm and behind that are two HDIs (head-disk interference sensors), at about x=8.5 μm and the read gap, RG, at about x=7 μm, which is the separation between read shields 10 and 30 in FIG. 1A. FIG. 1C represents, with a continuous line, the simulated vertical position (fly-height), z, of those various regions on the write head during a write TD.

In prior art Design A, the read element 20 is located between two read shields (10 and 30 in FIG. 1A). The read shields produce sufficient TD areas to trigger TD vibration in a Hr TD. They also provide a guard-band to protect the read element from head-disk interference (HDI) and TD wear. Unlike the consistent and effective results of a read element TD, during a write TD, the TD area and TD location can be very different for different designs, as shown schematically in FIGS. 1B, 1C, 2B, 2C, 3B and 3C.

For prior art Design A in FIG. 1A, the main issue is that in both a pre-heat process (energizing Hw only) and in a write TD (energizing both Hw and the write coil) TDA are very small, see TDA region, 150, in FIG. 1B, essentially encompassing the narrow write shield 100, the emergent MP, 91 and small side shields 90 in FIG. 1A. When the TDA is this small, TD detection will be very challenging, and head wear, due to contacts, seems unavoidable.

For prior art Designs B and C shown in FIGS. 2A and 3A respectively, it is very challenging for slider processes (processes involving shaping of the slider) to achieve a consistent protrusion or recession of a bumper pad 250 in FIGS. 2A and 3A or a top pad 300 in FIG. 3A, so the TDA and TD detection will have a large variation. In Design C, FIG. 3A, the top pad can be a writer shield, or a TD pad in the slider.

FIGS. 2B and 2C show the touchdown area (TDA) and flying height curve respectively during a touchdown of Design B. FIGS. 3B and 3C show the touchdown area (TDA) and flying height structure of Design C.

For all three prior art designs (A, B and C), the magnetic pole (MP) 91 and adjacent near-field transducer (NFT), both emerge at a write-gap and are unprotected during writer touchdowns (Hw TD) and ordinary write operations. As a consequence, the MP and NFT can be damaged and the writer will have lifetime and/or reliability concerns.

Unlike the stable read element situation, during an Hw TD, the TD area and its location as well as the amount of ABS protrusion could be very different for different head designs. This lack of consistency among different designs is a challenge to the creation of an effective slider-mounted write head that is not subject to excessive amounts of wear. The prior art just described shows various design approaches to provide a method of protecting read and write portions of a slider design, but none of them display the generality and effectiveness of the designs to be described below.

SUMMARY

A first object of this disclosure is to provide a simple method of providing a consistent slider profile, i.e., of protrusion or recession, during various types of touchdown (TD) events.

A second object of this disclosure is to ensure a consistent TD location and TD area (TDA) while still providing protection to the main pole (MP) and near-field transducer (NFT).

The first object stated above will be addressed by the elimination of metal shields that are exposed at the ABS at either side of the top yoke or on top of the top yoke of the inductive write head. This will produce a design that is similar to that illustrated in FIG. 1A.

The second object stated above will be implemented by moving the Hw to the top of the write coil, shown as 800 in FIG. 5, which is below the MP, rather than maintaining its present location on top of the MP as in the design illustrated in FIG. 1A. Three Hw positions, 850, 860 and 870, which are used in the prior art designs are now replaced by position 800. The leading shields can have different widths (in the cross-track dimension) and different thicknesses (in the down-track dimension) and any portion of the leading shields can be separated into different sections. As a result of these designs, the TD point during an Hw TD will be at the leading shields in a stable and consistent manner.

A fifth object of the present disclosure is to provide such a design that will operate, mounted within the present HDD, without additional costly modifications.

DETAILED DESCRIPTION

Figure 1A:
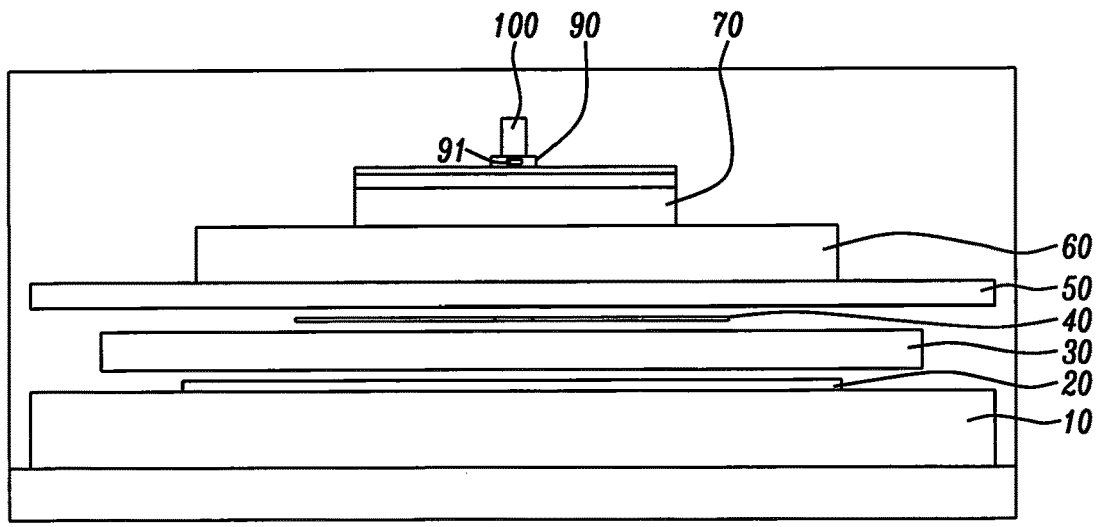
FIG. 1A is a schematic ABS view of a prior art PMR write head, denoted Design A, showing its elements.
Figure 1B:
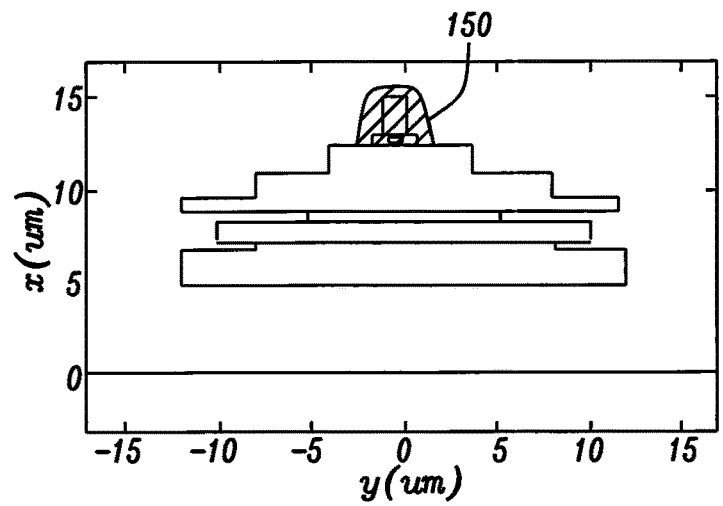
FIG. 1B is a schematic view of prior art FIG. 1A after a write TD showing a simulation of the region of contact.
Figure 2A:
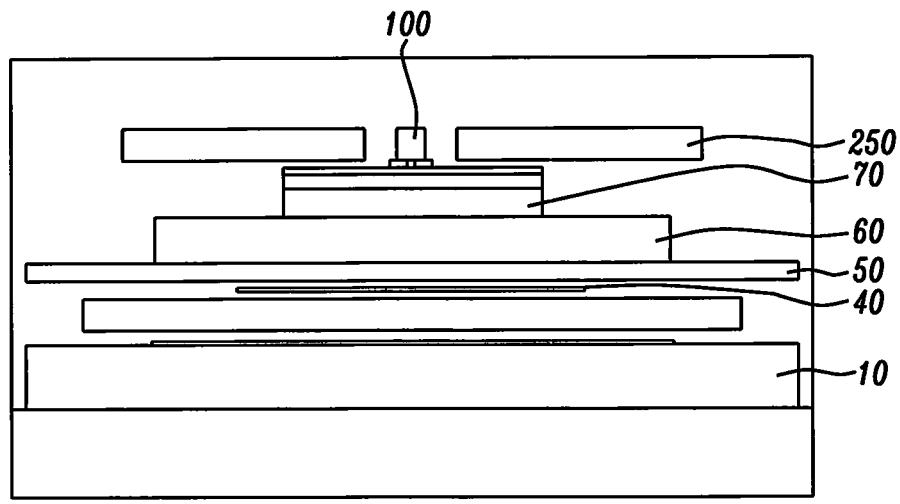
FIG. 2A is a schematic illustration of prior art Design B, showing its ABS.
Figure 2B:
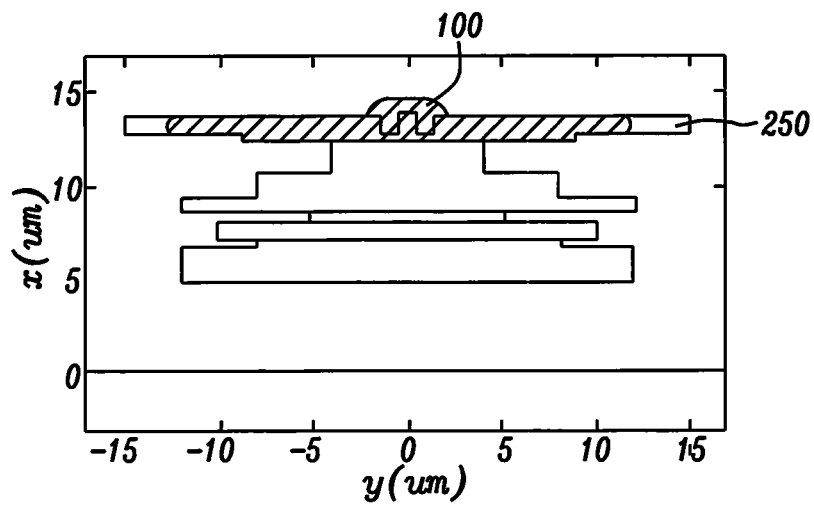
FIG. 2B is a schematic illustration showing the simulated area of a TD in prior art Design B of FIG. 2A.
Figure 2C:
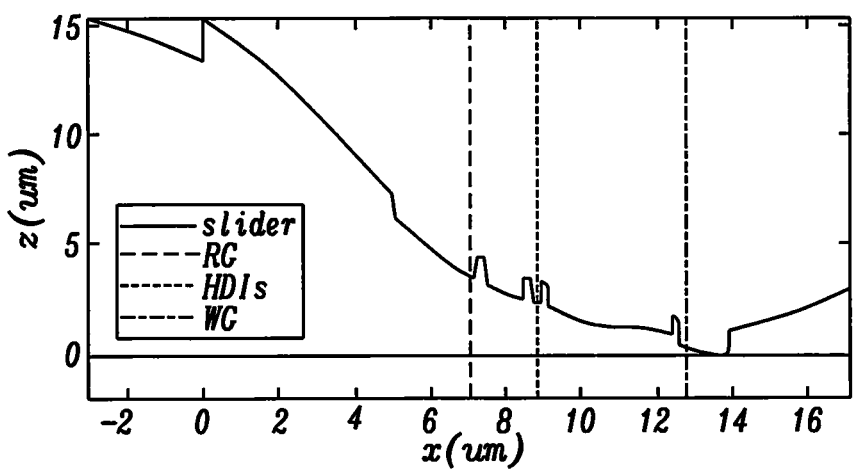
FIG. 2C is a graphical illustration of the fly height of portions of the prior art slider of 2A during a simulated write TD.
Figure 3A:
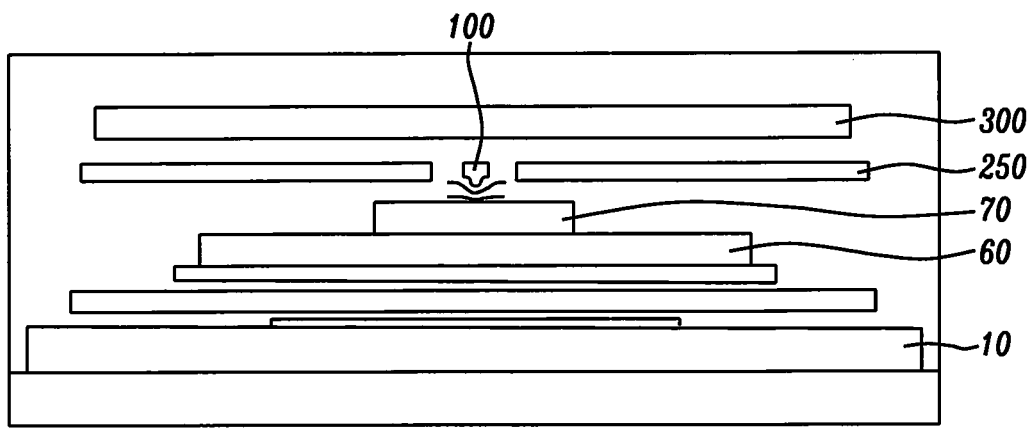
FIG. 3A is prior art Design C, showing the schematic illustration of the ABS of this third in a series of prior art designs.
Figure 3B:
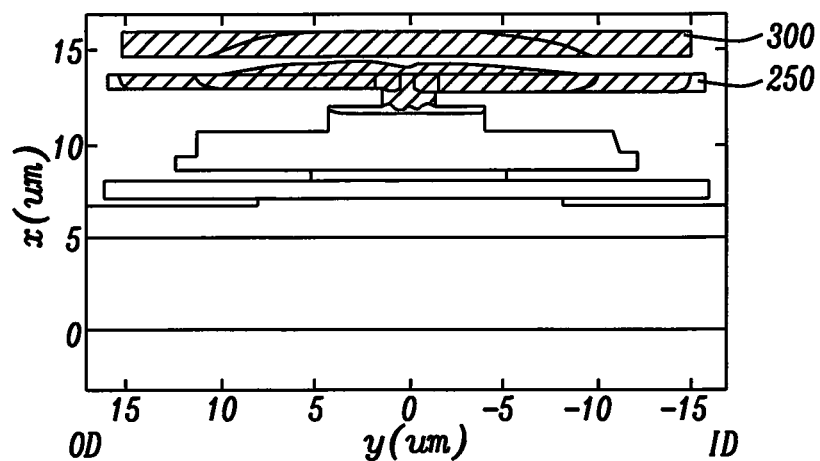
FIG. 3B is a schematic illustration showing the area of a simulated TD in prior art Design C of FIG. 3A.
Figure 3C:
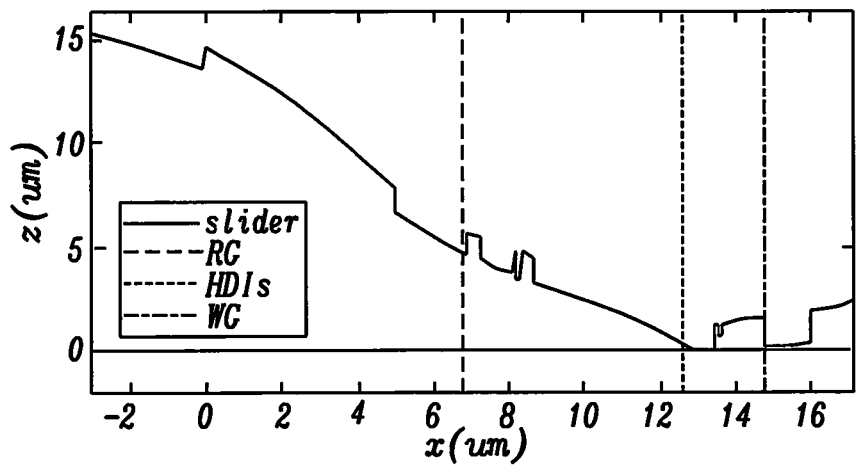
FIG. 3C is a graphical illustration of the fly height of portions of the prior art slider of FIG. 3A during the simulated write TD.

We have described a set of slider-mounted read/write head prior art designs (Design A in FIG. 1A, Design B in FIG. 2A and Design C in FIG. 3A) in which inadequate shield protection and inconsistent TD warnings make lifetimes a concern. Here, we will describe a new set of slider-mounted PMR designs, (LsTD1 in FIG. 4A, LsTD2 in FIG. 4B, LsTD3 in FIG. 4C and LsTD4 in FIG. 4D) in which the use of different arrangements and numbers of leading write shields protect the writer portion, MP and NFT, as shown using simulated write touchdowns.

In write operations, heating the writer portion of the slider causes thermal protrusion of the slider ABS in the vicinity of the MP and NFT so that write operations can take place from a position (flying height) very close to the disk surface. Reducing the flying height to bring the write head this close creates the danger of a touchdown (TD), in which case it is desired that the TD produces some form of a warning signal and that delicate components of the write head are protected. The warning signal is typically generated by vibrations of the write shields which are picked up by head-disk interference sensors (HDIs). The protection is accomplished by the effective positioning of the shields as will be discussed below.

In the following we will show the effects of touchdowns (simulated) on sliders having various shield configurations, making use of a basic arrangement of three sequentially contiguous leading shields for the write head and NFT. We concentrate on the effects of these shields on write touchdowns, although there are also read touchdowns that occur when the slider gets too close to the disk surface for read operations. Read touchdowns are already well controlled by read shields so it is the write touchdowns that are the subject of this disclosure.

To ensure a simple slider fabrication process (i.e., shaping the slider) and consistent slider profile (protrusion or recession) during operations, we disclose new designs based on a leading shield configuration and denoted LsTD1, LsTD2, LSTD3 and LsTD4, (FIG. 4A-4D). These designs eliminate metal shields exposed at the ABS at either side of top yoke or on top of top yoke. From an ABS view, the new designs disclosed (FIG. 4A-4D) may superficially appear somewhat similar to prior art Design A shown in FIG. 1A, but in operation they fulfill the objects of this disclosure which FIG. 1A would not.

Figure 5:
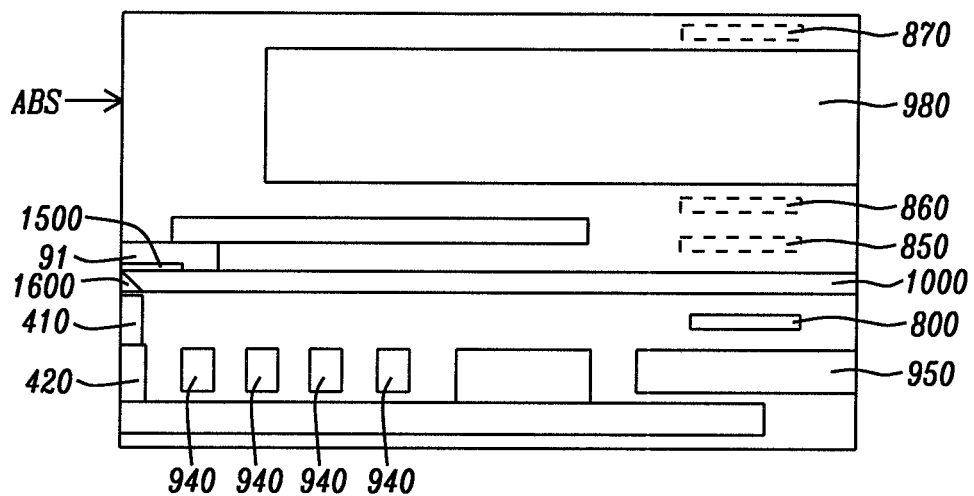
FIG. 5 is a schematic cross-sectional view of the inductive magnetic write head, showing its elements, including the waveguide of the TAMR system and the Hw formed on the upper surface of the write coil.

To ensure a consistent TD location and area (TDA) and to have protection for the MP and near-field transducer (NFT), we move the Hw to the top of the write coil (see 800 in FIG. 5). This repositioning makes the slider protrusion due to Hw heating shift to the leading shields as is shown in FIG. 6B. For a comparison, the possible locations of Hw would be above the MP in Designs A, B and C (FIGS. 1A, 2A and 3A), shown with dashed-lines as 850, 860 and 870.

Figure 4A:
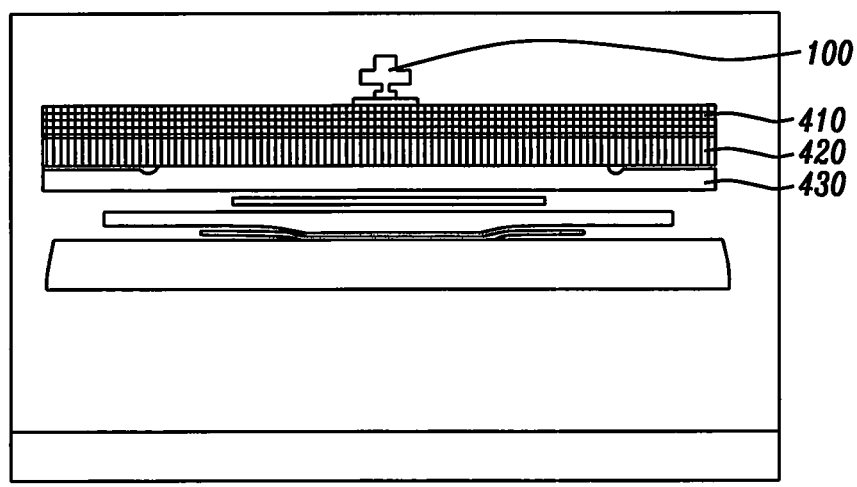
FIG. 4A is an example of a leading shield design, LsTD1, in which a leading write shield, W1, extends across the entire width of the write head.

The presently disclosed designs will be the designs shown in FIG. 4A-4D and in FIG. 5. In FIG. 4A, the three sequential, contiguous writer shields, W1 410, W2 420 and W3 430 have the same or different widths.

Figure 4B:
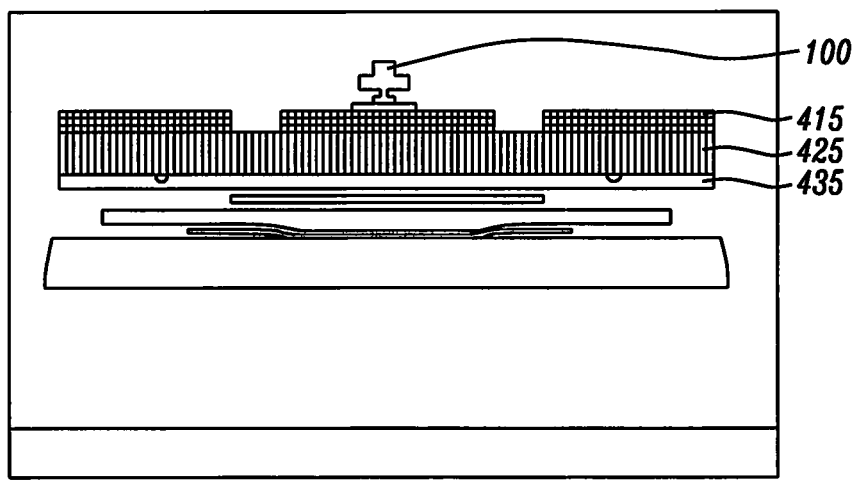
FIG. 4B is an example of a leading shield design, LsTD2, in which a leading write shield W1 is formed in three sections, with the combination extending across the entire width of the write head.

In FIG. 4B, the write shield W1 415 is formed in three symmetric sections, the remaining shields, W2 and W3 425, 435 can have the same or different widths but different thicknesses.

Figure 4C:
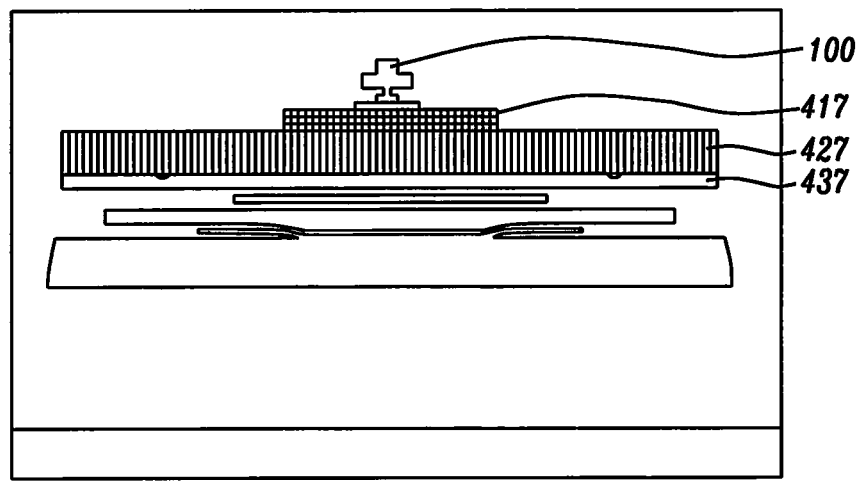
FIG. 4C is an example of a leading shield design, LsTD3, in which a leading write shield is formed in three sections, in which a single section, W1, is narrower than the width of the remaining two write shield sections, W2 and W3.

In FIG. 4C, shield W1 417 is now a single narrow shield, while shields W2 and W3 427 and 437 can have different widths and thicknesses. We call these three designs LsTD 1, LsTD 2 and LsTD 3 respectively. Note that the write gap region and upper write shield is simply designated 100 in each figure.

Figure 4D:
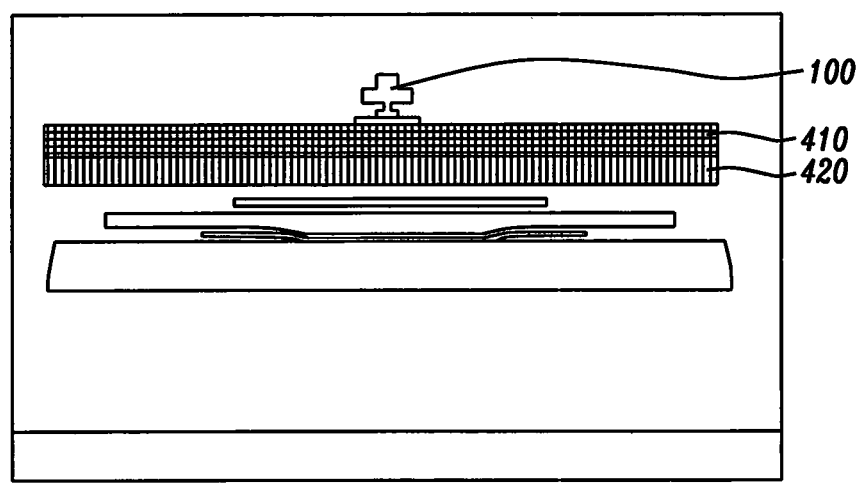
FIG. 4D is an example of a leading shield design, LsTD4, in which a leading write shield, W1, is equal to the width of a second write shield, W2.

In FIG. 4D there are only two contiguous shields, 410 and 420, like in FIG. 4A, but the third shield in FIG. 4A, 430, is absent. Again, the flexibility of the design permits the variation of the number of shields to be either three or two and the objects of the design will be met.

FIG. 5 is a cut-away schematic illustration of the TAMR-configured inductive write head of the present disclosure. It shows front 940 and back 950 cross-sections of a write coil. The write heater, Hw, 800 is over the back 950 portion of the coil, according to the present disclosure. Possible (dashed outline) heater locations 850, 860 and 870 representing locations used in prior art designs A, B and C but not positioned according to the present disclosure, are shown only for comparison purposes.

A waveguide 1000 terminates in a triangular blocker 1600 (blocking excess optical radiation) at the ABS and powers the NFT 1500 which is a small element between the MP tip 91 and the waveguide, containing the plasmon generator. The waveguide couples electromagnetically to the NFT which produces plasmon near-field energy at the position where the MP executes the recording process. Element 980 is a Cu block used for tuning the isothermal protrusion of the slider. It is an element found in prior art designs A, B and C as well.

Figure 6A:
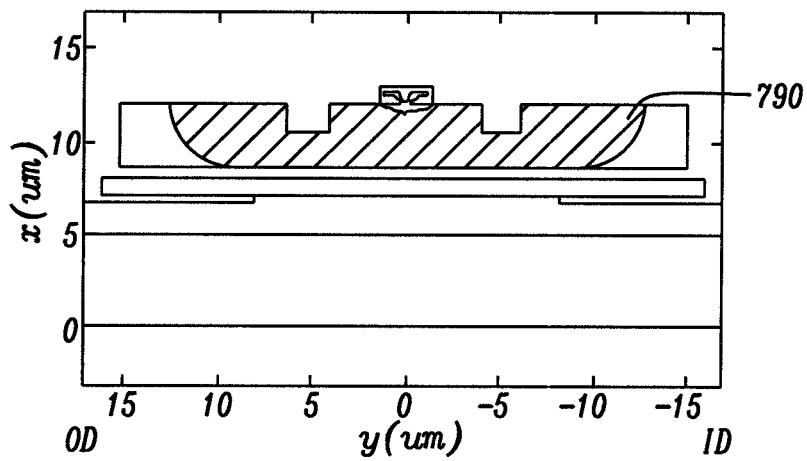
FIG. 6A schematically shows the simulated TDA of the design shown in FIG. 4B.
Figure 6B:
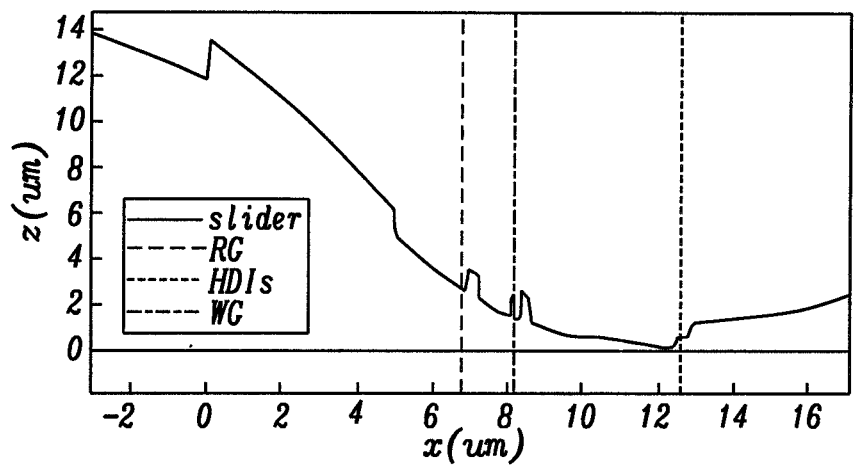
FIG. 6B shows the simulated flying height of the design of FIG. 4B during a TD.

FIGS. 6A and 6B taken together, schematically show that the TD location (the WG at x=12.5 in FIG. 6B) is at a leading shield with a large TDA (see shaded region 790 in FIG. 6A) which is the structure created by design LsTD2 in FIG. 4B. In this design, shield W1, 415 is formed in three sections. Both TD location and TD area will be consistent for both pre-heat and write TD, and will be insensitive to the protrusion profile.

Figure 1C:
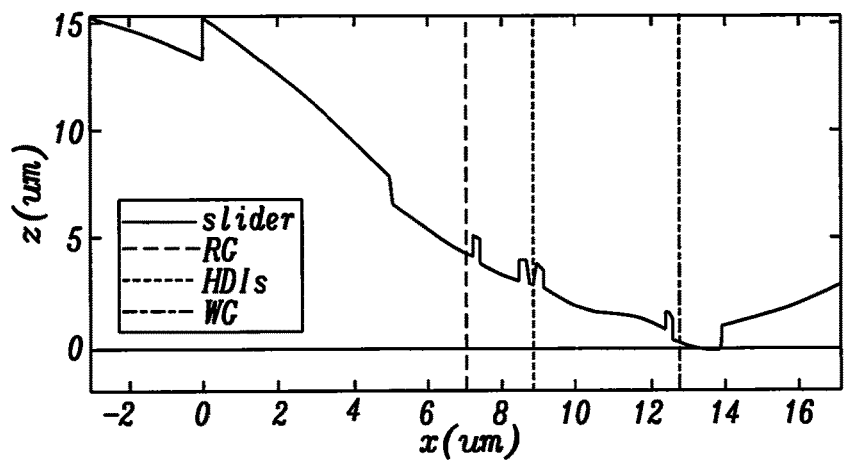
FIG. 1C is a graphical illustration of the fly height of portions of the prior art slider of FIG. 1A during the simulated write TD.

As shown in FIG. 6B, the MP and NFT are hidden behind the leading shields, so they are protected by the leading shields during Hw TD and write operations. This can be seen by noting in FIG. 6B that the leading shield edge is the lowest point of the slider contact, where the curve of the flying height shows a TD at z=0. As a result, the entire set of leading shields is in contact with the TD, producing a large TDA and protecting the WG region. The WG (or MP) and the NFT are raised above the lowest point and are behind the shield. Looking at FIG. 1C for comparison, the contact with the prior art slider occurs at 14 µm before the leading shield is reached, concentrating the contact at the small shield 100 and creating a very small TDA.

Based on modeling results discussed above, this new set of designs has the following advantages:
1) From the ABS view, the designs are very simple, yet offer great flexibility in the choice of widths and thicknesses of the shields. Further, there are fewer metal shields that are exposed to the ABS. In particular, looking at the ABS of FIGS. 4A, 4B, 4C and 4D, there are no metal shields to the sides of MP 100. As a result, slider processing will present fewer challenges, and PTR profile will be more consistent.

2) TD location and TDA will be consistent during pre-heat and write TD.
3) TD location is on a large, flat, metal shield, so the TD detection signal will be sharper and the TD point will be well defined.
4) MP and NFT are protected during TD and write operations, therefore there is less reliability concern.
5) This design can enable the use of a single, read only HDIs design with no need to have a separate write HDIs because the read HDIs is close to the TD location and will provide a sufficient warning.

Figure 7:
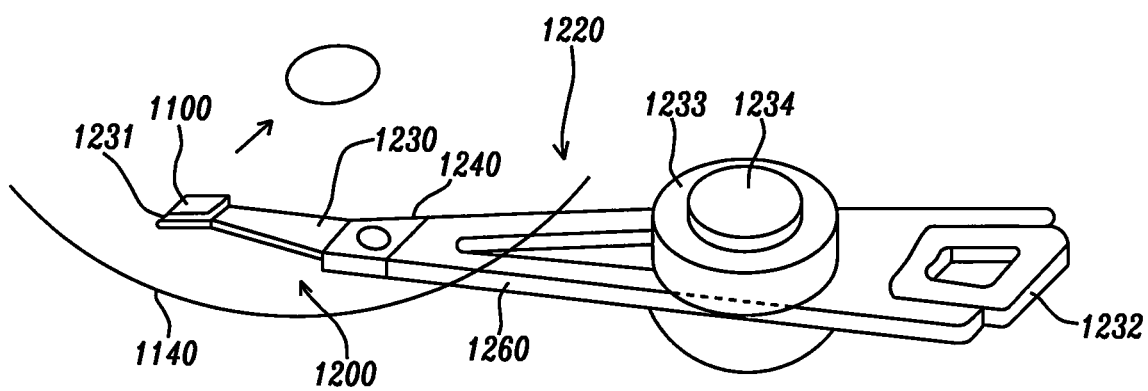
FIGS. 7, 8 and 9 are a sequence of schematic illustrations showing any of the designs shown in 4A, 4B or 4C incorporated within the components of an operational HDD.
Figure 8:
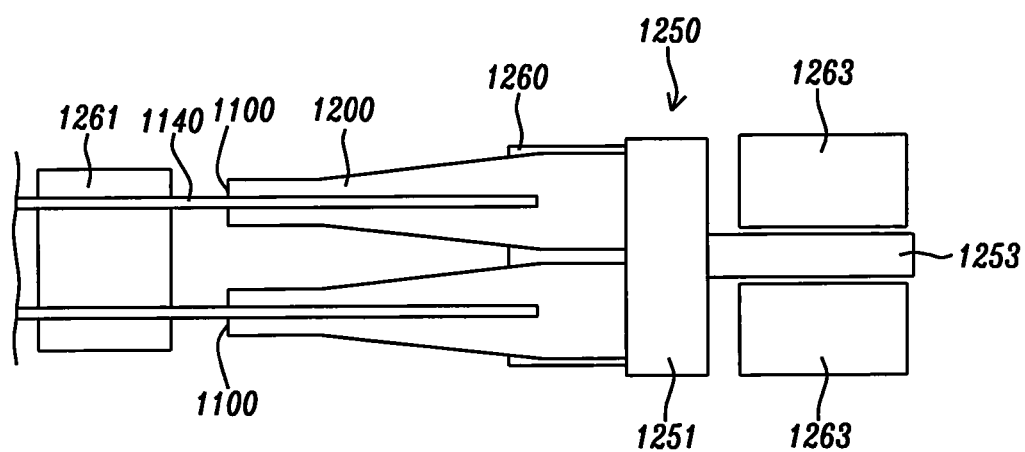
Figure 9:
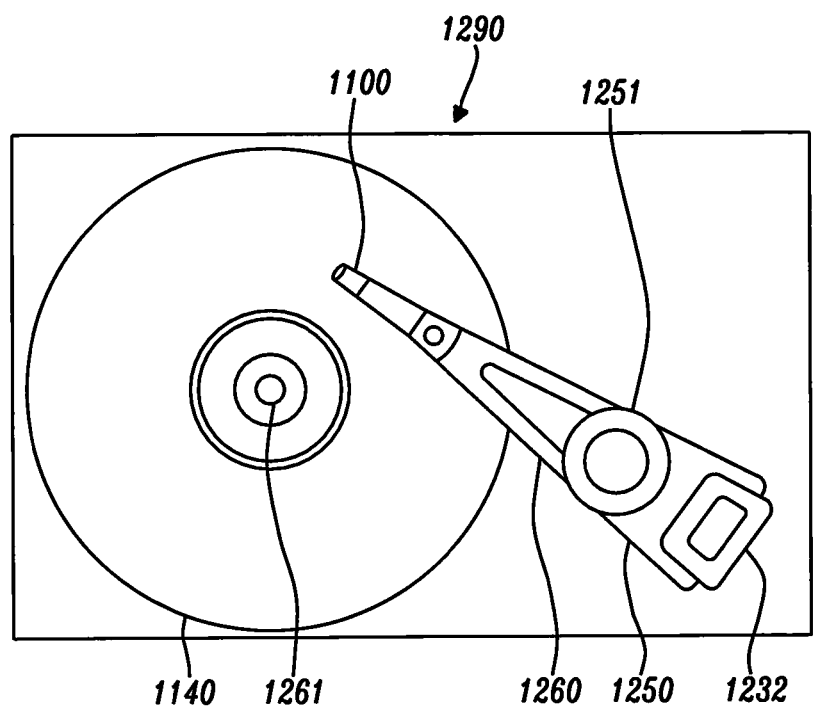

Referring finally to FIGS. 7, 8 and 9, there is shown, schematically, an exemplary magnetic recording apparatus, such as a TAMR configured hard disk drive (HDD), through whose use the PMR read/write head configured for TAMR described above will meet the objects of this disclosure.

FIG. 7 shows a head gimbal assembly (HGA) 200 that includes the slider-mounted PMR read/write head 100 and a suspension 220 that elastically supports the head 100. The suspension 220 has a spring-like load beam 230 made with a thin, corrosion-free elastic material like stainless steel. A flexure 231 is provided at a distal end of the load beam and a base-plate 240 is provided at the proximal end. The TAMR 100 is attached to the load beam 230 at the flexure 231 which provides the TAMR with the proper amount of freedom of motion. A gimbal part for maintaining the PMR read/write head at a proper level is provided in a portion of the flexure 231 to which the TAMR 100 is mounted.

A member to which the HGA 200 is mounted to arm 260 is referred to as head arm assembly 220. The arm 260 moves the read/write head 100 in the cross-track direction y across the medium 14 (here, a hard disk). One end of the arm 260 is mounted to the base plate 240. A coil 231 to be a part of a voice coil motor is mounted to the other end of the arm 260. A bearing part 233 is provided to the intermediate portion of the arm 260. The arm 260 is rotatably supported by a shaft 234 mounted to the bearing part 233. The arm 260 and the voice coil motor that drives the arm 260 configure an actuator.

Referring next to FIG. 8 and FIG. 9, there is shown a head stack assembly and a magnetic recording apparatus in which the read/write head 100 is contained. The head stack assembly is an element to which the HGA 200 is mounted to arms of a carriage having a plurality of arms. FIG. 8 is a side view of this assembly and FIG. 9 is a plan view of the entire magnetic recording apparatus.

A head stack assembly 250 has a carriage 251 having a plurality of arms 260. The HGA 200 is mounted to each arm 260 at intervals to be aligned in the vertical direction. A coil 231 (see FIG. 7), which is to be a portion of a voice coil motor is mounted at the opposite portion of the arm 260 in the carriage 251. The voice coil motor has a permanent magnet 263 arranged at an opposite location across the coil 231.

Referring finally to FIG. 8, the head stack assembly 250 is shown incorporated into a magnetic recording apparatus 290. The magnetic recording apparatus 290 has a plurality of magnetic recording media 14 mounted on a spindle motor 261. Each individual recording media 14 has two TAMR elements 100 arranged opposite to each other across the magnetic recording media 14 (shown clearly in FIG. 8). The head stack assembly 250 and the actuator (except for the read/write head itself) act as a positioning device and support the PMR heads 100. They also position the PMR heads correctly opposite the media surface in response to electronic signals. The read/write head records information onto the surface of the magnetic media by means of the magnetic pole contained therein.

To sum up, by properly adjusting PR for a PMR write head in a TAMR configuration one can ensure that it is the shields, that have a broad protrusion, act as bumper pads during a TD, both to enhance TD detection and to avoid wear at locations on a head where there is a sharp thermal protrusion.

As is understood by a person skilled in the art, the present description is illustrative of the present disclosure rather than limiting of the present disclosure. Revisions and modifications may be made to methods, materials, structures and dimensions employed in providing a slider-mounted read/write head configured for PMR TAMR recording, having a leading shield configuration that makes consistent determination of write touchdowns possible and protects the MP and NFT, while still providing such a device in accord with the spirit and scope of the present disclosure as defined by the appended claims.

We claim:

1. A slider-mounted read/write head configured for Thermally Assisted Perpendicular Magnetic Recording (PMR TAMR), comprising:
   a TAMR apparatus for supplying optical power to heat a magnetic disk;
   a slider mounted PMR inductive coil write head having a main magnetic pole (MP) for recording on said magnetic disk, and a near-field transducer (NFT) for transferring said optical power to said recording disk surface, wherein said MP and said NFT emerge at a write gap at an air-bearing surface (ABS) of said slider; and
   a write heater, Hw, for adjusting flying height during said write head operation; and
   three write shields, denoted WS1, WS2, and WS3, formed sequentially in a leading direction and contiguously on each other, wherein WS1 is immediately below said MP and NFT, and wherein faces of said shields are exposed at said ABS; wherein
   said PMR further comprises at least one head-disk interference sensor (HDIs) for detecting write TDs; wherein
   said three write shields have corresponding thicknesses T1, T2 and T3; and
   write shields WS1, WS2 and WS3 may be formed as single sections or in a multiplicity of symmetrically disposed sections, each section having a corresponding width and thickness; wherein
   said write head is mounted on a slider configured to provide aerodynamic stability when at an operational flying height.

2. A slider-mounted read/write head configured for Thermally Assisted Perpendicular Magnetic Recording (PMR TAMR), comprising:
   a TAMR apparatus for supplying optical power to heat a magnetic disk;
   a slider mounted PMR inductive coil write head having a main magnetic pole (MP) for recording on said magnetic disk, and a near-field transducer (NFT) for transferring said optical power to said recording disk surface, wherein said MP and said NFT emerge at a write gap at an air-bearing surface (ABS) of said slider; and
   a write heater, Hw, for adjusting flying height during said write head operation; and
   two write shields, denoted WS1 and WS2, formed sequentially in a leading direction and contiguously on each other, wherein WS1 is immediately below said MP and NFT, and wherein faces of said shields are exposed at said ABS; wherein said PMR further comprises at least one head-disk interference sensor (HDIs) for detecting write TDs; wherein said two write shields have corresponding thicknesses T1 and T2; and write shields WS1 and WS2 may be formed as single sections or in a multiplicity of symmetrically disposed sections, each section having a corresponding width and thickness; wherein said write head is mounted on a slider configured to provide aerodynamic stability when at an operational flying height.

3. The slider-mounted read/write head configured for Thermally Assisted Perpendicular Magnetic Recording (PMR TAMR) of claim 1 wherein said write heater is formed on said inductive write coil and below said magnetic pole (MP).

4. The slider-mounted read/write head configured for Thermally Assisted Perpendicular Magnetic Recording (PMR TAMR) of claim 2 wherein said write heater is formed on said inductive write coil and below said magnetic pole (MP).

5. The slider-mounted read/write head configured for Thermally Assisted Perpendicular Magnetic Recording (PMR TAMR) of claim 1 wherein there is only a single head-disk interference sensor (HDIs).

6. The slider-mounted read/write head configured for Thermally Assisted Perpendicular Magnetic Recording (PMR TAMR) of claim 2 wherein there is only a single head-disk interference sensor (HDIs).

7. The slider-mounted read/write head configured for Thermally Assisted Perpendicular Magnetic Recording (PMR TAMR) of claim 1 wherein said WS1 is formed into three sections, symmetrically disposed about a center line.

8. The slider-mounted read/write head configured for Thermally Assisted Perpendicular Magnetic Recording (PMR TAMR) of claim 2 wherein said WS1 is formed into three sections, symmetrically disposed about a center line.

9. The slider-mounted read/write head configured for Thermally Assisted Perpendicular Magnetic Recording (PMR TAMR) of claim 1 wherein said WS1 is formed as a single section that is narrower than said WS2 and WS3, wherein both WS2 and WS3 are of equal widths.

10. The slider-mounted read/write head configured for Thermally Assisted Perpendicular Magnetic Recording (PMR TAMR) of claim 2 wherein said WS1 is formed as a single section that is narrower than said WS2.

11. The slider-mounted read/write head configured for Thermally Assisted Perpendicular Magnetic Recording (PMR TAMR) of claim 1 wherein during a write TD contact with said read/write head is at said leading shields.

12. The slider-mounted read/write head configured for Thermally Assisted Perpendicular Magnetic Recording (PMR TAMR) of claim 2 wherein during a write TD contact with said read/write head is at said leading shields.

13. The slider-mounted read/write head configured for Thermally Assisted Perpendicular Magnetic Recording (PMR TAMR) of claim 1 wherein there are no metal shields co-linear with said MP and formed to either side of it.

14. The slider-mounted read/write head configured for Thermally Assisted Perpendicular Magnetic Recording (PMR TAMR) of claim 2 wherein there are no metal shields co-linear with said MP and formed to either side of it.

15. The slider-mounted read/write head configured for Thermally Assisted Perpendicular Magnetic Recording (PMR TAMR) of claim 1 wherein said TAMR configuration comprises a source for supplying power in the form of electromagnetic radiation, a waveguide to transfer said electromagnetic radiation towards an ABS and a near-field transducer (NFT) at said ABS comprising a plasmon generator to produce plasmon modes by coupling to said electromagnetic radiation and to then direct near-field energy from said plasmon modes to a position on a disk that is generally coincident with a region upon which said write head directs a magnetic flux.

16. The slider-mounted read/write head configured for Thermally Assisted Perpendicular Magnetic Recording (PMR TAMR) of claim 2 wherein said TAMR configuration comprises a source for supplying power in the form of electromagnetic radiation, a waveguide to transfer said electromagnetic radiation towards an ABS and a near-field transducer (NFT) at said ABS comprising a plasmon generator to produce plasmon modes by coupling to said electromagnetic radiation and to then direct near-field energy from said plasmon modes to a position on a disk that is generally coincident with a region upon which said write head directs a magnetic flux.

17. A head gimbal assembly, comprising
The slider-mounted PMR read/write head of configured for Perpendicular Magnetic Recording Thermally Assisted Recording (PMR TAMR) of claim 1;
a suspension that elastically supports said slider-mounted PMR TAMR read/write head, wherein
said suspension has a flexure to which said slider-mounted PMR TAMR read/write head is joined, a load beam with one end connected to said flexure and a base plate connected to the other end of said load beam.

18. A head gimbal assembly, comprising
The slider-mounted PMR read/write head of configured for Perpendicular Magnetic Recording Thermally Assisted Recording (PMR TAMR) of claim 2;
a suspension that elastically supports said slider-mounted PMR TAMR read/write head, wherein
said suspension has a flexure to which said slider-mounted PMR TAMR read/write head is joined, a load beam with one end connected to said flexure and a base plate connected to the other end of said load beam.

19. A hard disk drive (HDD), comprising:
said head gimbal assembly of claim 17;
a magnetic recording medium positioned opposite to said slider-mounted PMR TAMR read/write head;
a spindle motor that rotates and drives said magnetic recording medium;
a device that positions said slider relative to said magnetic recording medium.

20. A hard disk drive (HDD), comprising:
said head gimbal assembly of claim 18;
a magnetic recording medium positioned opposite to said slider-mounted PMR TAMR read/write head;
a spindle motor that rotates and drives said magnetic recording medium;
a device that positions said slider relative to said magnetic recording medium.

* * * * *